United States Patent [19]

Hopper

[11] 4,424,852

[45] Jan. 10, 1984

[54] BEAD-CHAIN DRIVE SYSTEM FOR A WINDOW SHADE

[76] Inventor: Thomas P. Hopper, P.O. Box 689, R.F.D. #1, Durham, Conn. 06422

[21] Appl. No.: 191,406

[22] Filed: Sep. 29, 1980

[51] Int. Cl.[3] .......................... E06B 9/20; F16G 15/00

[52] U.S. Cl. .................................... 160/309; 160/321; 24/116 A; 474/154; 474/203

[58] Field of Search ............. 24/116 A, 116 R, 115 R; 160/309, 319, 321, 256, 257, 258, 307, 308, 268; 474/152, 202, 211, 154, 203

[56] References Cited

U.S. PATENT DOCUMENTS

| | | | |
|---|---|---|---|
| 1,541,261 | 6/1925 | Harris | 160/258 |
| 1,546,848 | 7/1925 | Lundgren | 160/319 |
| 1,820,503 | 8/1931 | Senior | 160/321 X |
| 2,005,334 | 6/1935 | Caspar | 24/116 R |
| 2,165,492 | 7/1939 | Lorentzen | 160/177 |
| 2,250,957 | 7/1941 | Hunter | 160/268 R |
| 2,383,015 | 8/1945 | Pratt | 160/319 X |
| 2,564,831 | 8/1951 | Butkus | 24/116.1 |
| 2,577,046 | 12/1951 | Svirsky | 160/321 |
| 2,749,976 | 6/1956 | Lewis | 160/168 |
| 2,791,911 | 5/1957 | Wasko | 474/154 |
| 2,894,578 | 7/1959 | Caesar et al. | 160/308 |
| 3,104,700 | 9/1963 | Polsky | 160/DIG. 16 |
| 3,424,224 | 1/1969 | Lowe | 160/308 |
| 4,020,889 | 5/1977 | Karoll | 160/120 |
| 4,139,044 | 2/1979 | Brolin | 160/321 |
| 4,223,714 | 9/1980 | Weinrich | 160/319 |

FOREIGN PATENT DOCUMENTS 867202 12/1952 Fed. Rep. of Germany ... 24/116 A

*Primary Examiner*—Peter M. Caun

*Assistant Examiner*—Cherney S. Lieberman

*Attorney, Agent, or Firm*—Fitzpatrick, Cella, Harper & Scinto

[57] ABSTRACT

A bead-chain drive system for operating and positioning a window shade comprises a roller having a window shade mounted thereon, the roller being urged by the weight of the window shade in a direction to lower the shade. The drive system further includes a sprocket for driving the roller that is driven by a bead-chain, trained about the sprocket. The bead-chain includes a chain length urged toward the sprocket by the weight of the shade applied to the roller and the sprocket. The drive system also includes a bead-chain retainer having a holding device operative to hold at least one of the beads of the chain length against movement toward the sprocket to position the window shade and from which the chain length can be easily freed upon movement thereof away from the sprocket. The bead-chain retainer further has a bead engagement and guiding device operative upon release of the chain length to engage a bead of the length and guide this bead into engagement with the holding device to stop further movement of the chain length toward the sprocket and to prevent further lowering of the window shade.

24 Claims, 22 Drawing Figures

Fig. 8.
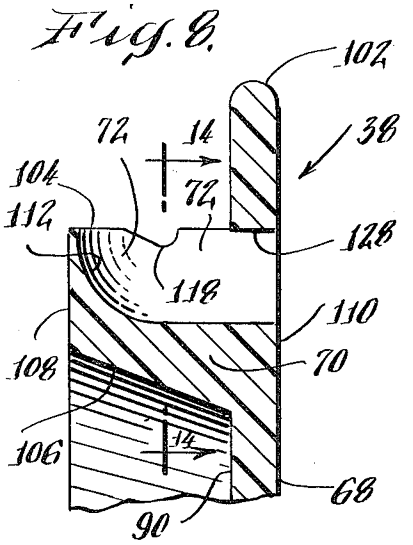
Fig. 9.
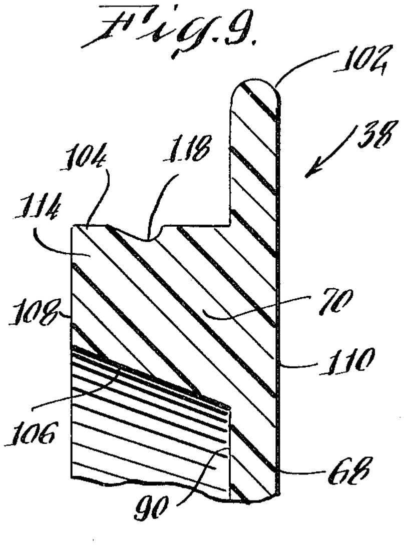
Fig. 10.
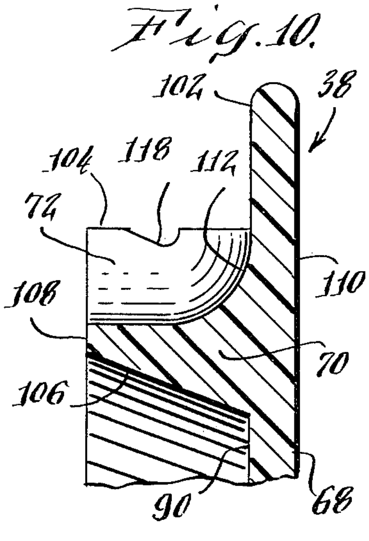
Fig. 11.
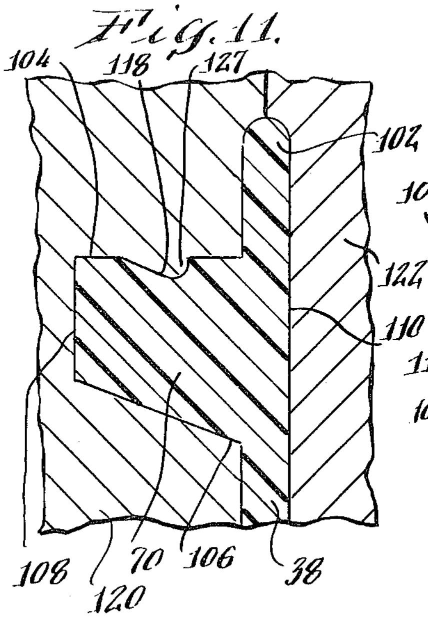
Fig. 12.
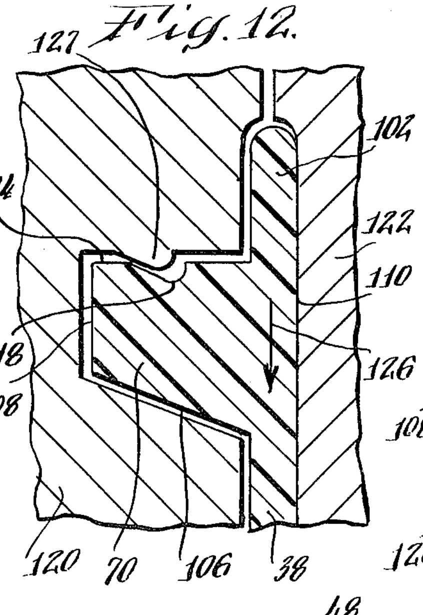
Fig. 13.
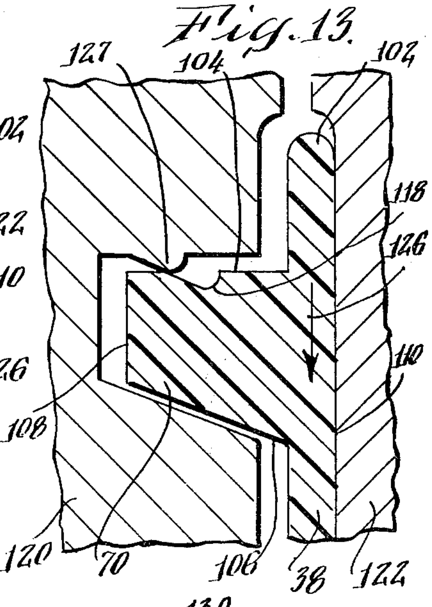
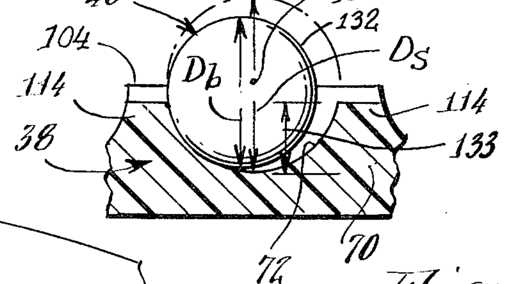
Fig. 15.
Fig. 14.
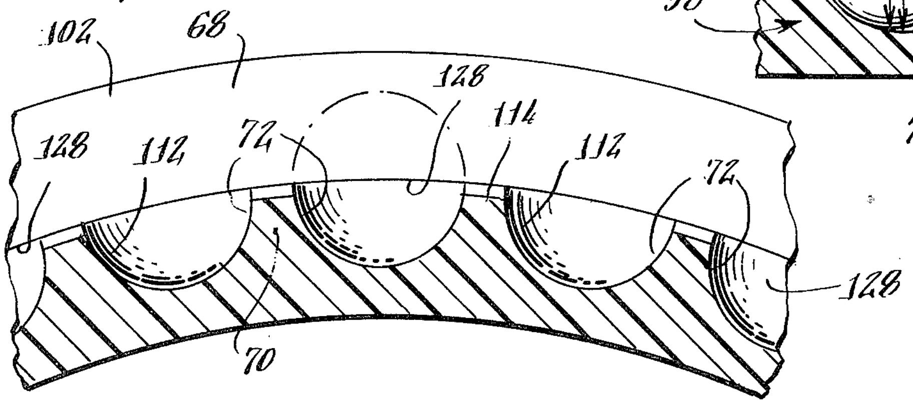

BEAD-CHAIN DRIVE SYSTEM FOR A WINDOW SHADE

BACKGROUND OF THE INVENTION

1. Field of the Invention

The present invention relates to a bead-chain drive system for operating and positioning a window shade. More specifically the present invention relates to a bead-chain drive system including a sprocket for driving a roller having a window shade thereon and a bead-chain retainer for holding the bead-chain to position the window shade and from which the bead-chain is easily freed to permit repositioning of the shade. Of course, while reference is made in this specification and claims to use of this system with a window shade, it may be used with any similar rollable material.

2. Description of the Prior Art

Bead-belt drives ordinarily include a sprocket driven by a bead-chain. The bead-chain is formed of a series of beads, which may be made for example, of metal or plastic, spaced apart by links. Metal bead-chains comprise hollow metal balls connected by dumbell shaped links. Plastic bead-chains comprise solid beads of plastic molded on a cord at uniform spacing to form the chain.

Sprockets operable by a bead-chain are well known. A conventional sprocket comprises a wheel having a peripheral rim formed with a circumferential series of sockets for engaging beads of the bead-chain. The sprockets may be made by molding, casting or machining. Promotional material entitled "Bead-belt drives", by Bernard Wasko, published by Voland Corporation, 27 Centre Avenue, New Rochelle, N.Y., discloses various types of sprockets for use in bead-chain drives that include sprockets having bead sockets of various shapes such as conically shaped, spherically shaped and semi-spherically shaped sockets. In one sprocket having semi-spherical sockets, adjacent sockets are formed by entrant mold portions that project from opposite sides of the sprocket rim so that the sprocket can be molded in a single piece with a two part mold. However, it is believed that in such a sprocket, secondary operations subsequent to the molding operation would be necessary to form notches in the walls separating the sockets to provide clearance for the connecting links of the bead-chain.

Bead-belt drives are used primarily in apparatus operating at relatively slow speeds or intermittently. In a conventional bead-belt drive system, a sprocket is attached to the object such as a shaft, to be driven or rotated. The sprocket is driven by a bead-chain trained about the sprocket, the bead-chain having first and second chain lengths extending from the sprocket to provide for rotation of the object in both clockwise and counterclockwise directions. The shaft and therefore the sprocket which is attached to it, are then urged in a first direction by a force such as the weight of an article carried on the shaft. However, in such a case a mechanism for stopping rotation of the shaft and sprocket in the direction urged by the force should be provided.

The present invention provides unique improvements in conventional bead-chain drives such as those generally described above.

BRIEF SUMMARY OF THE INVENTION

In a preferred embodiment, the bead-chain drive system for operating and positioning a window shade, in accordance with the present invention, comprises a roller, having a window shade mounted thereon, that is rotatable to raise and lower the window shade. The roller is urged in one direction by the weight of the window shade. A sprocket is secured to one end of the roller and is driven by a bead-chain trained about it, that has a first chain length extending from the sprocket. To raise the window shade, the first chain length is moved in tension away from the sprocket to rotate the roller. When tension is released on the first chain length, the first chain length is moved toward the sprocket by the weight of the shade and the window shade is lowered.

The bead-chain drive system also includes a retainer comprising a holding device operative to hold at least one bead of the first chain length against movement toward the sprocket to position the window shade in a fixed position. The holding device also permits the first chain length to be easily freed therefrom upon movement thereof away from the sprocket. The retainer further includes an engaging and guiding device operative upon release of the first chain length, with movement of the first chain length toward the sprocket, to engage a bead of the first chain length and guide the bead into engagement with the holding device thereby stopping further movement of the first chain length toward the sprocket and preventing further lowering of the window shade.

In accordance with an additional aspect of the present invention the bead-chain retainer comprises a body having elongate side walls defining a channel for movement of the first chain length. The retainer also includes a device for defining a passage which directs the chain length along the channel. The retainer includes at least one pair of ribs, one rib extending from one side wall and another rib extending from another side wall of the channel, the ribs having a space therebetween for accommodating a link of the bead-chain. The ribs extend at an angle oblique with respect to the longitudinal axis of the channel. The pair of ribs engages a bead of the chain length and guides the bead into a socket located in the floor of the channel when the first chain length is released and moves toward the sprocket. The socket and ribs then hold the bead against further movement toward the sprocket.

As another aspect of the invention, the bead-chain retainer includes a plurality of pairs of ribs extending from the channel walls at an angle oblique with respect to the longitudinal axis of the channel in generally parallel alignment. One of the pairs of ribs extends a greater distance than the other pairs to engage one bead of the bead-chain and guide the other beads of the bead-chain into engagement with the other pairs of ribs. The force necessary to decelerate the first chain length is applied to and distributed over a plurality of beads by the several pairs of ribs of the retainer. The beads, once they decelerate and come to rest are held in bead retaining sockets located on the floor of the channel and by the ribs. This arrangement distributes the tension force applied to the first chain length of the bead-chain to a plurality of beads.

The bead-chain sprocket designed in accordance with still another aspect of the present invention, comprises a wheel having a peripheral rim formed with a circumferential series of sockets for engaging beads of the bead-chain. The wheel has a central portion for attachment at one side thereof to the end of the window shade roller. In order to reduce or prevent spreading or splintering of the end of the roller, the sprocket further includes a cylindrical collar extending laterally from the side of the wheel to fit over the roller in order to center the two together and prevent the roller from spreading outwardly when fasteners, such as screws or nails, are driven through the wheel into the roller. The wheel includes a recess that receives a portion of a bracket upon mounting the shade and that allows the sprocket to be positioned closely to a window or door jamb.

The sprocket of the present invention includes a flange extending radially outwardly beyond the rim at one side thereof to shield the bead-chain from a window shade mounted on the roller. The flange reduces the likelihood that the shade will become entangled with the bead-chain and that the window shade or the sprocket will be damaged.

The sprocket in accordance with another aspect of the present invention has a structure which allows it to be formed in a single piece by injection molding with a two part mold. The sprocket has a wheel including a peripheral rim having an outer surface formed with a circumferential series of sockets for engaging the beads of the bead-chain and having walls separating the sockets. The walls separating the sockets include notches extending between the sockets for accommodating the links of the bead-chain. In order to allow for formation by molding in a single piece, the inner surface of the rim is sloped radially outwardly relative to the wheel center. The sloped inner surface of the rim allows for formation of the notches through shrinkage of the part as it is being stripped from the mold.

Other objects, aspects and advantages of bead-drive systems and parts thereof in accordance with the present invention will be apparent from the following detailed description of the invention with reference to the drawings.

BRIEF DESCRIPTION OF THE DRAWINGS

FIG. 8 is an enlarged radial cross-sectional view of the rim of the sprocket taken on plane 8—8 in FIG. 5;

FIG. 9 is an enlarged radial cross-sectional view of the rim of the sprocket taken on plane 9—9 in FIG. 5;

FIG. 10 is an enlarged radial cross-sectional view of the rim of the sprocket taken on plane 10—10 in FIG. 5;

FIG. 11 is a schematic cross-sectional view of a first stage of a molding operation for forming a sprocket in accordance with the present invention, the view of the sprocket being the same as that view shown in FIG. 9;

FIG. 12 is a cross-sectional view of a second stage of the molding process;

FIG. 13 is a cross-sectional view of a third stage of the molding process;

FIG. 14 is a vertical cross-sectional view on plane 14—14 in FIG. 8;

FIG. 15 is a schematic view of a bead of a bead-chain engaging a socket of the sprocket and driving the sprocket in a counter-clockwise direction;

DETAILED DESCRIPTION OF THE PREFERRED EMBODIMENT

Figure 1:
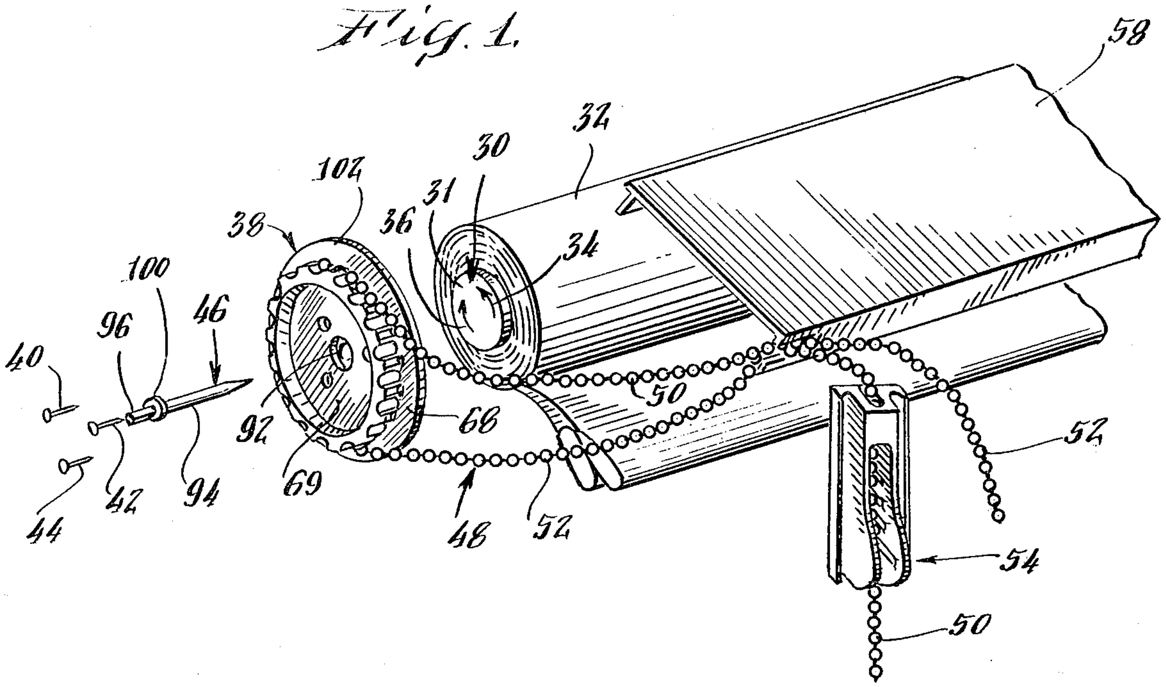
FIG. 1 is an exploded perspective view of a bead-chain drive system for operating and positioning a window shade in accordance with the present invention.
Figure 2:
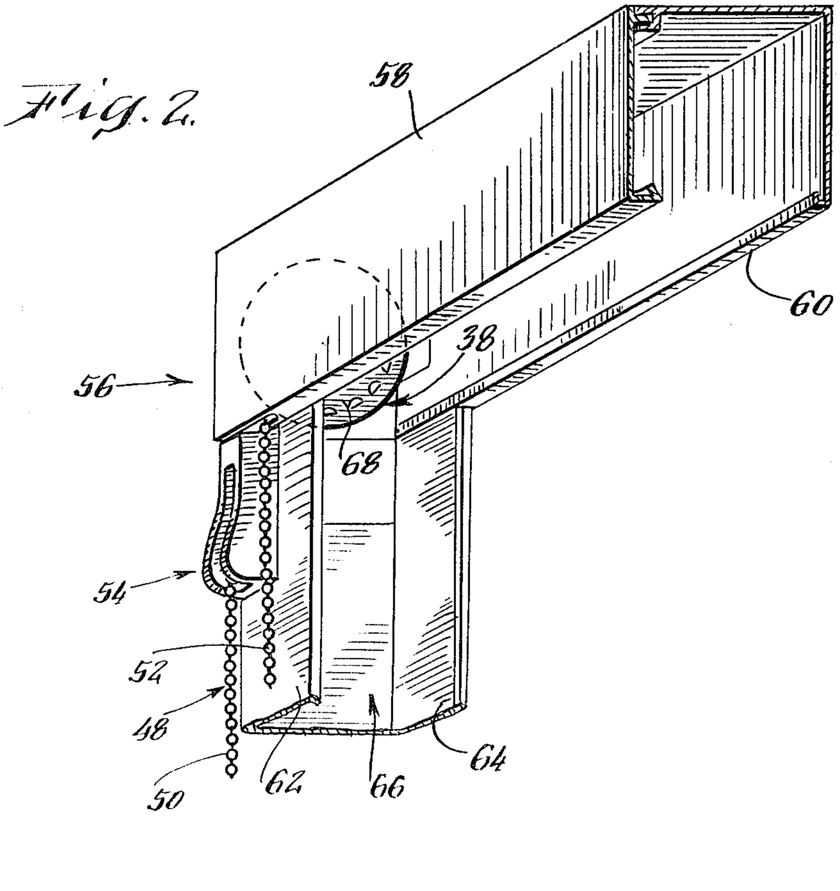
FIG. 2 is a perspective view of the bead-chain drive system shown in FIG. 1 attached to the framing adjacent a conventional window.

Referring first to FIGS. 1 and 2, a bead-chain drive system for operating and positioning a window shade comprises a roller 30 having a window shade 32 mounted thereon. The roller is rotatable in a first direction, as shown by arrow 34, to lower the window shade and in a second direction, as shown by arrow 36, to raise the window shade. The weight of the window shade urges the roller 30 in the first direction to lower the shade.

The bead-chain drive system further includes a sprocket 38, for driving the roller 30, that is attached to the end 31 of the roller by three screws 40, 42 and 44. An axle 46 extends through center 92 of sprocket 38 to support the sprocket 38 and roller 30 for rotation in a conventional bracket 98 (shown in FIG. 3).

The sprocket 38 is driven by a bead-chain 48 trained over it and having a first chain length 50 and a second chain length 52 extending therefrom. To operate and position window shade 32, first chain length 50 may be grasped by hand and moved in tension away from sprocket to drive the sprocket to rotate the roller 30 in the direction of arrow 36 thereby raising the shade. When tension is released on the first chain length 50, it moves toward the sprocket 38 under the influence of the weight of the shade 32 applied to the roller 30 and the sprocket 38. In order to position the window shade 32 at a desired elevation, the shade 32 is raised or lowered to the desired position by movement of the first chain length 50. Once in the desired position, chain 50 may be held in position by a retainer 54 described in greater detail below.

Retainer 54 is operative to hold at least one of the beads of the first chain length 50 against movement toward the sprocket 38 to position the window shade 32 at a desired elevation. The retainer 54 also permits the first chain length 50 to be easily freed therefrom upon movement of the length away from the sprocket 38 so that the shade can be raised. The retainer further operates upon release of the first chain length 50 to engage a bead of the length and guide it into engagement with a holding device and stop further movement of the length 50 toward the sprocket 38. Therefore, further lowering of the shade 32 is stopped.

Figure 3:
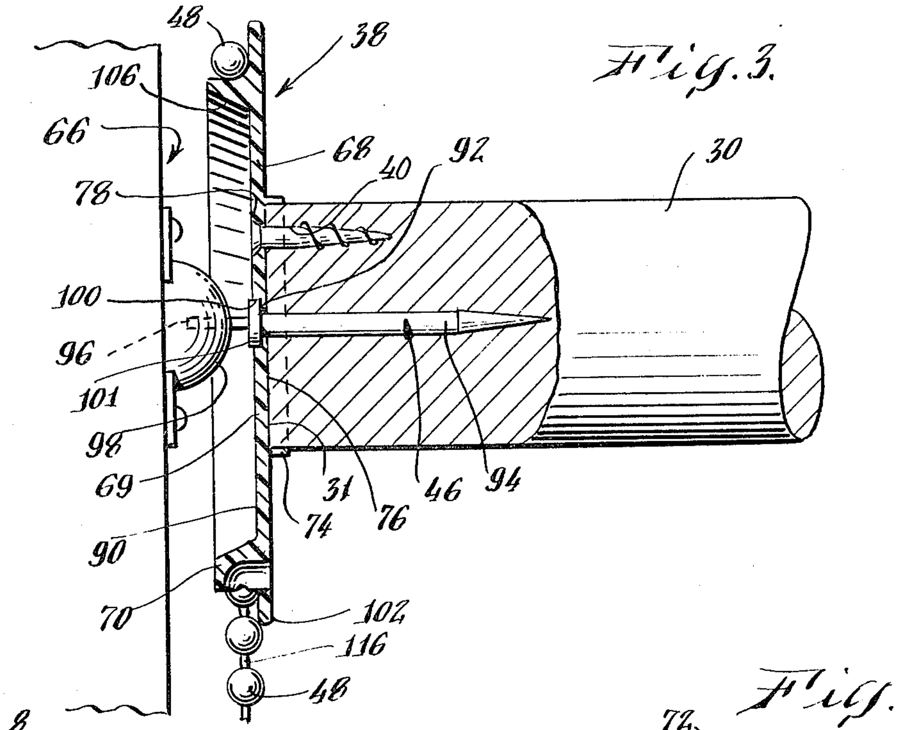
FIG. 3 is a vertical cross-sectional view of a sprocket attached at one side to a window shade roller and at the other side to a supporting bracket mounted on a window frame providing for rotation of the sprocket and the roller.

As shown in FIGS. 1, 2 and 3, the bead-chain drive system can be mounted in or adjacent a frame. A typical frame 56 includes two horizontal members 58 and 60, which are spanned by the roller 30 and window shade 32, and further includes jamb sealing members 66 for receiving shade 32 when it is moved downwardly. When used with insulating shades for reducing transfer of heat therethrough, such as those described in U.S. Pat. Nos. 4,039,019 (Hopper) and 4,194,550 (Hopper), side members 62 and 64 of the jamb sealing member 66 substantially prevent air flow between the shade and the window frame.

Figure 5:
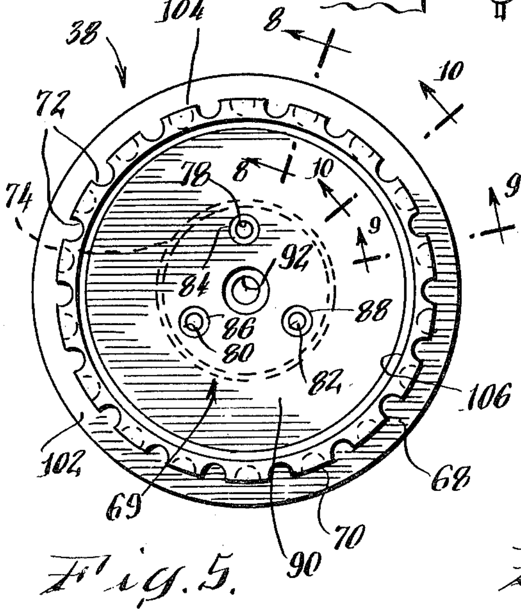
FIG. 5 is a front elevational view of the sprocket shown in FIG. 4.
Figure 4:
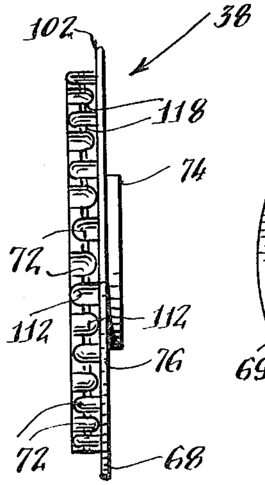
FIG. 4 is a side view of the sprocket shown in FIG. 3.
Figure 6:
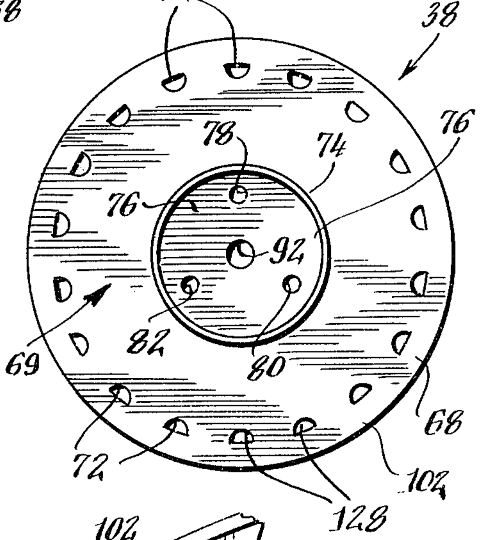
FIG. 6 is a rear elevational view of the sprocket shown in FIG. 4.
Figure 7:
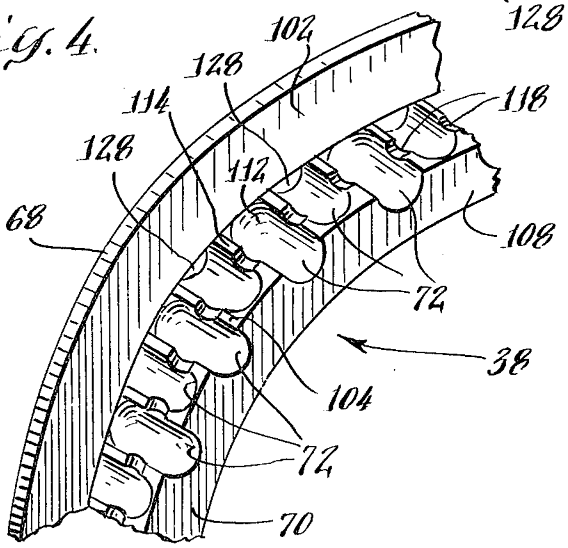
FIG. 7 is an enlarged perspective view of the rim of the socket shown in FIG. 4.
Figure 16:
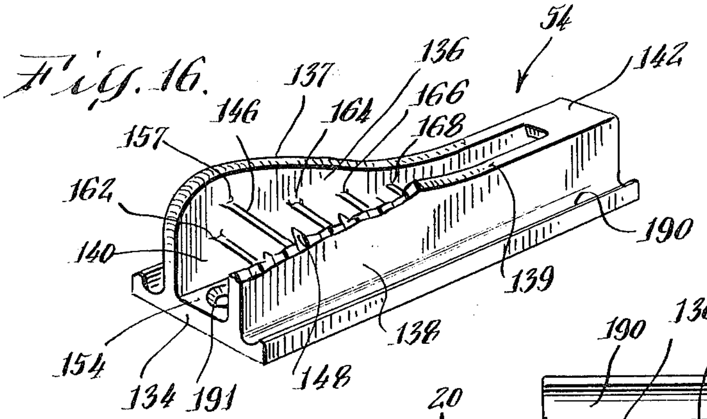
FIG. 16 is an enlarged perspective view partially cut away to show internal detail of a bead retainer in accordance with the present invention.
Figure 17:
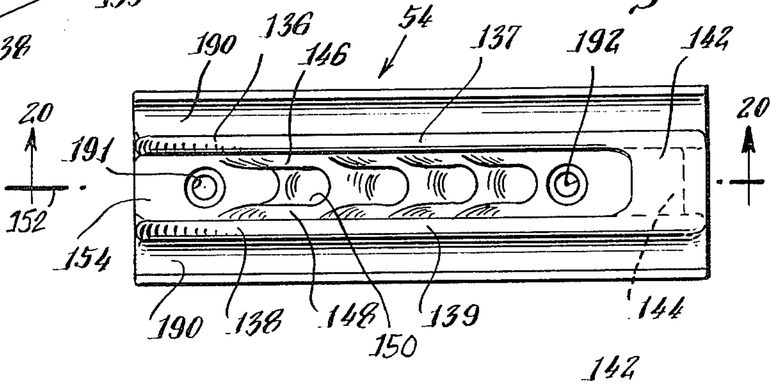
FIG. 17 is a top plan view of the retainer shown in FIG. 16.
Figure 18:
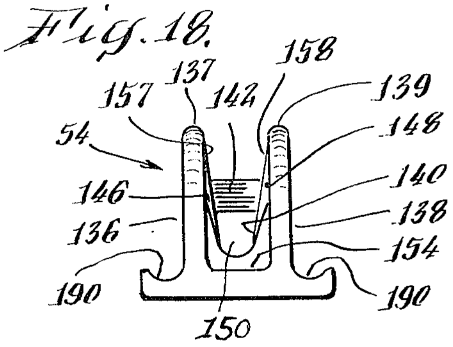
FIG. 18 is a front elevational view of the retainer shown in FIG. 16.
Figure 19:
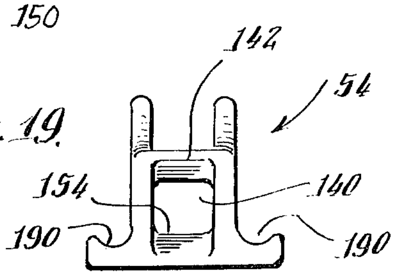
FIG. 19 is a rear elevational view of the retainer shown in FIG. 16.

Referring to FIGS. 3 through 15, the bead-chain sprocket 38 will now be described in detail. Sprocket 38 includes a wheel 68 having a central wheel portion 69 for attachment at one side or the back to roller end 31. Wheel 68 further includes a peripheral rim 70 formed with a circumferential series of sockets 72 for engaging beads of bead-chain 48. A cylindrical collar 74 extends laterally from the back 76 of central wheel portion 69 and is coaxial with respect to cylindrical rim 70. Cylindrical collar 74 fits over roller end 31 to confine it against spreading outwardly upon attachment of the sprocket 38 to roller end 31 by screws 40, 42 and 44. As shown in FIGS. 5 and 6 central wheel portion 69 includes three holes 78, 80 and 82 for respectively receiving screws 40, 42 and 44. Each screw hole 78, 80 and 82 has, on the periphery thereof, a slanted and recessed wall 84, 86 and 88 for accommodating the head of the screws 40, 42 and 44 to allow the screws to be mounted flush with respect to front surface 90 of wheel 68 as best shown in FIG. 3. The center of wheel 68 includes a hole 92 for receiving the axle 46 that is driven into roller end 31 and which includes a protruding mounting portion 96 insertable into a bracket 98. The bracket is mounted on window frame 66 and protrudes outwardly therefrom (see FIG. 3). Axle hole 92 includes a recessed wall 100 which allows axle head 101 to be centered and mounted substantially flush with respect to side 90 of wheel 68.

As window shade 32 is rolled to a raised or lowered position, portions of the window shade may move toward the rim 70 of sprocket 38 and become entangled with bead-chain 48. In order to reduce the likelihood of entanglement between the window shade 32 and bead-chain 48 when the bead-chain drives the sprocket, the back of wheel 68 includes a flange 102 extending radially outwardly beyond rim 70 to shield bead-chain 48 from the window shade 32 during operation of the window shade roller 30.

In accordance with a further feature of the present invention, sprocket 38 is formed as a single piece by injection molding with a two part mold. The design which permits this to be done is shown in FIGS. 3 through 15, and in particular, FIGS. 7 through 10. Rim 70 includes an outer peripheral surface 104, an inner peripheral surface 106 and side surfaces 108 and 110. Adjacent sockets each have a partially spherical portion 112 that open alternately to side surfaces 108 and 110 of rim 70. A wall 114 extends between and separates each socket from adjacent sockets. To accommodate links 116 of bead-chain 48, each wall 114 includes a circumferentially extending notch 118.

The inner surface 106 of rim 70 is sloped radially outward from the central wheel portion 69 to allow the sprocket 38 to be molded in a single piece without the need of secondary operations to form notches 118. FIGS. 11, 12 and 13 show the importance of having a sloped inner surface 106 during molding operations. The mold for forming sprocket 38 comprises a first half 120 and a second half 122 which part at the center line of flange 102. FIG. 11 shows the relationship of mold halves 120 and 122 in the closed position for receiving molding material. It should be understood that the materials used in sprocket 38 are thermoplastic resins and, upon cooling, contract. In the case of the sprocket, the diameter of the sprocket 38 decreases upon cooling and tends to shrink radially inwardly. As shown in FIG. 12, after the mold halves 120 and 122 have been filled with resin, mold half 120 is moved laterally outwardly from sprocket 38 a small increment. Because inner surface 106 of rim 70 is sloped, a clearance is provided adjacent surface 106 to allow rim 70 to shrink radially inwardly in the direction of arrow 126. A slope of the nibs 127 on the mold half 120, for forming the notches 118, is the same as the slope of the surface 106 so that the part may be easily released from the mold half 120 as the part shrinks. As shown in comparison between FIGS. 12 and 13, as the mold half 120 is drawn laterally outwardly and the rim 70 shrinks radially inwardly in the direction of arrow 126, nib 127 completely clears outer surface 104 of rim 70. Thus, the sprocket can be formed with a two-piece mold in a single molding operation without secondary operations for forming notches 118.

Also, to provide for formation of sprocket 38 in a single molding operation, as shown in FIGS. 6, 7, 8 and 14, flange 102 has apertures 128 therein to allow for insertion and removal of extensions (not shown in the drawings) from mold half 122 to form sockets such as those shown in these figures.

Referring to FIGS. 14 and 15, each socket 72 has a partially spherical shape centered about a point 130 and constitutes one-half or less than one-half of a sphere. As shown in FIGS. 14 and 15, each spherical socket 72 has a diameter $D_s$ and is sized to receive beads 132 of bead-chain 48, only one bead 132 being shown in FIG. 15. FIG. 15 shows schematically a bead-chain 48 driving a sprocket 38. As shown in the figures the diameter of the bead, $D_b$ is substantially less than the diameter of the sphere, $D_s$. The socket 72 has a depth 133 which is greater than one half of the diameter, $D_b$ of the beads 132. This dimensional relationship between the sockets 72 and beads 132 accommodates small inconsistencies in the size and spacing of beads in the chain yet enhances positive drive of the sprocket by movement of the chain.

While generally spherical sockets are preferred other socket shapes may be used.

Referring to FIGS. 1, 2 and 16 through 22, the retainer 54 and the operation thereof will now be described in detail. Retainer 54 includes a body 134 having elongate side walls 136 and 138 defining a channel 140 through which the first chain length 50 of the bead-chain moves. A top wall segment 142 extends between and bridges walls 136 and 138 at one of their ends to define a passage 144 directing chain length 50 through the channel 140.

The side walls have gently sloping top edges 137 and 139 that tend to direct the first chain length into the channel when the chain length is released.

At least one pair of ribs 146 and 148 extend respectively from side walls 138 and 136 and have a space 150 therebetween for accommodating a link of first chain length 50. Ribs 146 and 148 extend at an angle oblique with respect to the longitudinal axis of channel 140. The floor 154 of channel 140 includes at least one retaining socket 156 for holding one of the beads of length 50 against movement in a direction toward sprocket 38 and from which the chain length is freed upon movement thereof in a direction away from the sprocket 38. Upon release of chain length 50 and subsequent movement of length 50 toward the sprocket, the upper regions 157 and 158 of ribs 146 and 148 engage a bead of the chain length 50 and guide the bead into engagement with the retaining socket 156, thereby stopping further movement of chain length 50 towards sprocket 38.

According to a further feature of the present invention, a plurality of pairs of ribs 162, 164, 166 and 168 extend from said elongate walls 136 and 138 at an angle oblique with respect to the longitudinal axis 152 of channel 140. The ribs 146 and 148 extend a greater distance from floor 154 of channel 140 to first engage one bead of the chain length 50 and guide the other beads of the chain length 50 into engagement with the other pairs of ribs 162, 164, 166 and 168. These ribs, 162, 164, 166 and 168 together with ribs 146 and 148 guide beads of chain length 50 into engagement with sockets 170, 172, 174, 176 and 156.

Figure 20:
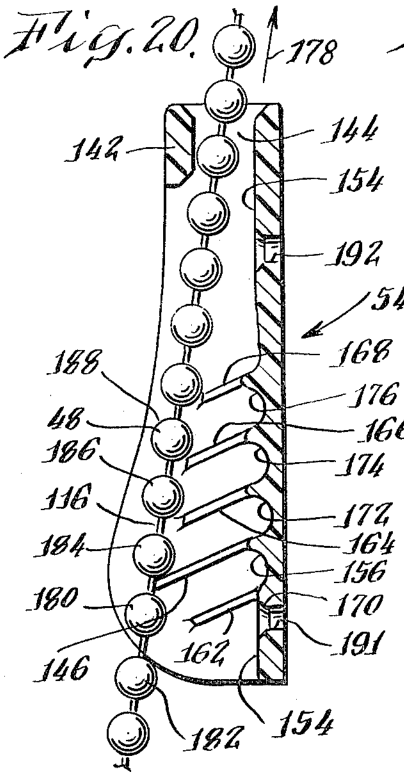
FIG. 20 is a vertical cross-sectional view of the retainer shown in FIG. 17 taken on plane 20—20 with one of the beads of the bead-chain being engaged by one pair of ribs of the retainer.
Figure 21:
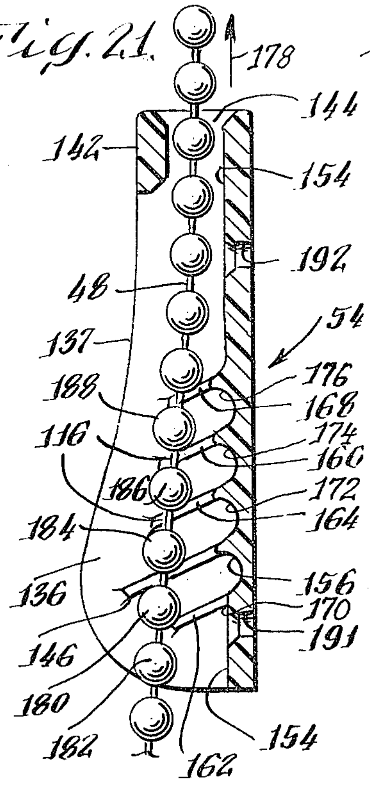
FIG. 21 is a vertical cross-sectional view of the retainer, identical to FIG. 20, showing a bead-chain in which a plurality of beads have been engaged by a plurality of pairs of ribs.
Figure 22:
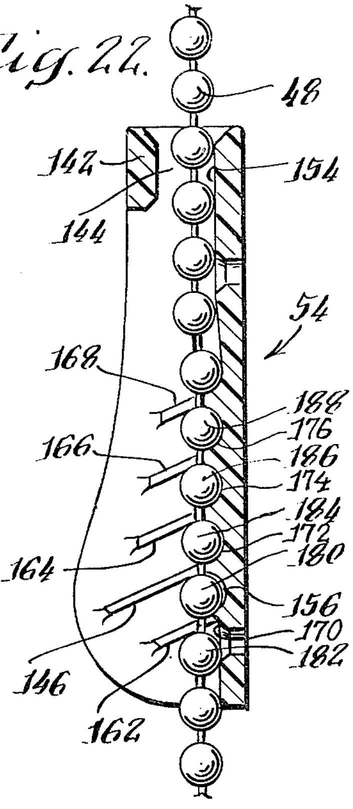
FIG. 22 is a vertical cross-sectional view of the retainer, identical to FIG. 20, showing the beads of said bead-chain held in a plurality of ribs and sockets located on the floor of the retainer to prevent further upward movement of the bead-chain.

Referring to FIGS. 20, 21 and 22, the operation of the bead-chain retainer will now be described. Upon release of the chain length from one's grasp and subsequent movement of the chain length in the direction shown by arrow 178, upper regions 157 and 158 of ribs 146 and 148 first engage only bead 180 of bead length 50. Ribs 146 and 148 guide bead 180 downwardly into channel 140. As shown in FIG. 21, beads 182, 184, 186 and 188 are then engaged respectively by rib pairs 162, 164, 166 and 168 which guide the beads toward sockets 170, 172, 174 and 176. By having a plurality of rib pairs 162, 164, 166 and 168, the chain decelerating force is applied to a number of beads 180, 182, 184, 186 and 188 to distribute the load on the chain and thereby minimize the chance of breaking the chain. As shown in FIG. 22, the beads 182, 180, 184, 186 and 188 come to rest in sockets 170, 156, 172, 174, and 176 to prevent further movement of chain length 50 toward sprocket 38. The sockets also confine the beads individually to prevent their spreading which would cause the chain to break. In the position shown in FIG. 22, the tension force applied to the chain length 50 is spread among a plurality of beads rather than just a single bead.

In accordance with a further aspect of the invention, retainer 54 includes, one and preferably two elongate grooves 190 positioned on the outer sides of walls 136 and 138 for receiving and guiding the second chain length 52. The floor 154 includes two holes 191 and 192 for accommodating fasteners for mounting the retainer 54. Additionally, this retainer is designed so that it can be made by an injection molding process using a two piece mold.

Accordingly, although a specific embodiment of the present invention has been described above in detail, this is only for purposes of illustration. Modification can be made to the bead-chain drive system of the invention to adapt it to specific applications.

I claim:

1. A bead-chain drive system for operating and positioning an article such as a window shade or the like, comprising:

a roller having an article mounted thereon and rotatable in first and second directions to lower and raise said article, said roller being urged in said first direction by the weight of said article;

a sprocket for driving said roller and being driven by a bead-chain trained about said sprocket, said bead-chain having first and second chain lengths extending from said sprocket, said bead-chain comprising beads spaced apart by links, said first chain length when moved in tension away from said sprocket driving said sprocket to rotate said roller in said second direction to raise said article, said first chain length when said tension is released thereon being moved toward said sprocket by the weight of said article applied to said roller and said sprocket; and a retainer, mounted in fixed position relative to said article, including an elongate body having a floor; elongate side walls projecting from said floor and together therewith defining an elongate channel having an opening opposite said floor; a top wall segment extending between said side walls at a location spaced from said floor to form a passage to direct said first chain length along said channel; and a plurality of pairs of ribs, one rib in each pair extending from one side wall and the other rib in each pair extending from the other side wall, and both ribs in each pair extending at an angle oblique with respect to the longitudinal axis of said channel, one of said pairs of ribs extending a greater distance than the others of said pairs of ribs, each of said pairs of said ribs defining a space therebetween for accommodating a link of the bead chain and thereby comprising means operative to hold at least one of the beads of said first chain length against movement toward said sprocket to position said article, said opening of said channel enabling movement of said first chain length away from said sprocket to disengage said first chain length from said holding means, said one of said pairs of ribs comprising said holding means further being operative upon release of said first chain length with movement of said first chain length toward said sprocket to engage one bead of the bead chain and guide other beads of the bead chain into engagement with the others of said pairs of ribs thereby stopping further movement of said first chain length toward said sprocket and preventing further lowering of said article.

2. A bead-chain drive system comprising:

a sprocket rotatable in first and second directions to drive a roller attached thereto, said sprocket being urged by a force in said first direction;

a bead-chain trained about said sprocket and having first and second chain lengths extending from said sprocket, said bead-chain comprising beads spaced apart by links, said first chain length when moved in tension away from said sprocket driving said sprocket in said second direction against said force, said first chain length when said tension is released thereon being moved toward said sprocket by the urging of said force; and a retainer, mounted in fixed position relative to said sprocket, including an elongate body having a floor; elongate side walls projecting from said floor and together therewith defining an elongate channel having an opening opposite said floor; a top wall segment extending between said side walls at a location spaced from said floor to form a passage to direct said first chain length along said channel; and a plurality of pairs of ribs, one rib in each pair extending from one side wall and the other rib in each pair extending from the other side wall and both ribs in each pair extending at an angle oblique with respect to the longitudinal axis of said channel, one of said pairs of ribs extending a greater distance than the others of said pairs of ribs, each of said pairs of said ribs defining a space therebetween for accommodating a link of the bead chain and thereby comprising means operative to hold at least one of the beads of said first chain length against movement toward said sprocket, said opening of said channel enabling movement of said first chain length in a direction away from said sprocket to disengage said first chain length from said holding means, said one of said pairs of ribs comprising said holding means further being operative upon release of said first chain length with movement of said first chain length toward said sprocket to engage one bead of the bead chain and guide other beads of the bead chain into engagement with the others of said pairs of ribs thereby stopping further movement of said first chain length toward said sprocket.

3. A bead-chain drive system according to claim 1 or 2 wherein said holding means further comprises a retaining socket located in said floor for each said pair of ribs, for holding a bead against movement in said one direction, each said pair of ribs extending upward from one retaining socket along said channel side walls.

4. A bead-chain drive system according to claim 1 or 2 wherein said passage is bounded by said channel floor, said side walls and said top wall segment and has extent in the direction of the longitudinal axis of said channel greater than the diameter of one bead.

5. A bead-chain drive system according to claim 1 or 2 wherein said top wall segment is located at one end of said channel.

6. A bead-chain drive system according to claim 1 or 2 wherein said holding means comprises a plurality of bead retaining sockets for holding beads of said bead-chain against movement in said one direction and for distributing the tensional force applied to said bead-chain among a plurality of beads.

7. A bead-chain drive system according to claim 1 or 2 wherein said elongate side walls are tallest in the region of said holding means and wherein said side walls have gently curved edges sloping from said region to the remainder thereof for guiding said chain into said channel.

8. A bead-chain drive system according to claim 1 or 2 wherein said sprocket comprises a wheel having a peripheral rim formed with a circumferential series of sockets for engaging beads of said bead-chain and having a central wheel portion for attachment at one side thereof to an end of said roller, and a cylindrical collar extending laterally from said one side and coaxial with respect to said cylindrical rim to fit over said roller end to center and confine it against spreading outwardly upon attachment of the sprocket to it by fasteners passed through said central wheel portion.

9. A bead-chain drive system according to claim 1 or 2 wherein said sprocket comprises a wheel having a peripheral rim formed with a circumferential series of sockets for engaging beads of said bead-chain, said wheel having one side for attachment to said roller, and flange means extending radially outwardly beyond said rim at said one side thereof.

10. A bead-chain drive system according to claim 1 or 2 wherein said sprocket comprises a wheel including a peripheral rim having an outer surface formed with a circumferential series of sockets for engaging said beads of the bead-chain and having walls separating said sockets, an inner surface and at least one side surface, at least a portion of said sockets opening to said side surface of said rim, said walls separating said sockets including notches extending between said sockets for accommodating said links of said bead-chain, and said inner surface of said rim being sloped radially outwardly relative to the wheel center.

11. A bead-chain drive system according to claim 1 or 2 wherein said roller is supported at at least one end by a mounting bracket and wherein said sprocket comprises a wheel including a peripheral rim formed with a circumferential series of sockets for engaging beads of said bead-chain, said wheel having a central wheel portion for attachment at one side thereof to said roller adjacent said mounting bracket and said central wheel portion having a recess for accommodating at least a portion of said mounting bracket.

12. A bead-chain drive system according to claim 1 or 2 wherein said sprocket comprises a wheel having a peripheral rim formed with a circumferential series of sockets for engaging beads of said bead-chain, said sockets being formed by a portion of a sphere having a diameter greater than said diameter of the beads of the bead-chain.

13. A bead-chain drive system according to claim 12 wherein said sphere portion is no greater than one half of a sphere.

14. A bead-chain drive system according to claim 13 wherein said socket has a depth greater than one half of said diameter of said beads and said sockets are separated by walls having notches therein for accommodating the links of the bead-chain.

15. A bead-chain drive system according to claim 14 wherein said rim has a first side surface and a second side surface and wherein each socket opens to one of said side surfaces.

16. A bead-chain drive system according to claim 15 wherein adjacent sockets open to opposite sides of the rim.

17. A bead-chain drive system according to claim 16 including flange means extending radially outwardly from said first side surface of said rim, said flange including apertures therein aligned with sockets opening at said first side surface of the rim.

18. A retainer for a bead-chain having beads spaced apart by links, a length of said chain extending along the retainer and being urged in one direction relative thereto, said retainer comprising:

an elongate body having

- a floor;
- elongate side walls projecting from said floor and together therewith defining an elongate channel having an opening opposite at least a portion of said floor;
- a top wall segment extending between said side walls at a location spaced from said floor to form a passage to direct said chain length along said channel; and
- a plurality of pairs of ribs, one rib in each pair extending from one side wall and the other rib in each pair extending from the other side wall and both ribs in each pair extending at an oblique angle with respect to the longitudinal axis of said channel, one of said pairs of ribs extending a greater distance than the others of said pairs of ribs, each of said pairs of said ribs defining a space therebetween, for accommodating a link of the bead chain and thereby comprising means operative to hold at least one of the beads of said length against movement in said one direction, said opening of said channel enabling movement of said length in an opposite direction to disengage said length from said holding means;

said one of said pairs of ribs comprising said holding means further being operative upon release of said chain length with movement of said length in said one direction to engage one bead of the chain length and guide other beads into engagement with the others of said pairs of ribs thereby stopping further movement of the chain length.

19. A bead-chain retainer according to claim 18, wherein said elongate side walls are tallest in the region of said holding means and wherein said side walls have gently curved edges sloping from said region to the remainder thereof for guiding said chain into said channel.

20. A bead-chain retainer according to claim 18 wherein said holding means further comprises a retaining socket located in said floor for each said pair of ribs, for holding a bead against movement in said one direction, each said pair of ribs extending upward from one retaining socket along said channel side walls.

21. A bead-chain retainer according to claim 18 wherein said passage is bounded by said channel floor, said side walls and said top wall segment and has extent in the direction of the longitudinal axis of said channel greater than the diameter of one bead.

22. A bead-chain retainer according to claim 18 wherein said top wall segment is located at one end of said channel.

23. A bead-chain retainer according to claim 18 wherein said holding means comprises a plurality of bead retaining sockets for holding beads of said bead-chain against movement in said one direction and for distributing the tensional force applied to said bead-chain among a plurality of beads.

24. A bead-chain retainer according to claim 18 wherein said body of said retainer includes, at at least one side of said channel, an elongate groove for receiving said bead-chain.

* * * * *